US005317841A

United States Patent [19]

Cook et al.

[11] Patent Number: 5,317,841

[45] Date of Patent: Jun. 7, 1994

[54] METHOD FOR REMOVAL OF SURFACE CONTAMINANTS FROM METAL SUBSTRATES

[75] Inventors: Jack R. Cook, Farmington, N. Mex.; Loren L. Hatle, Rapid City, S. Dak.

[73] Assignee: Whitemetal, Inc., Houston, Tex.

[21] Appl. No.: 938,202

[22] Filed: Aug. 28, 1992

[51] Int. Cl.[5] .............................................. B65G 53/40

[52] U.S. Cl. .......................................... 51/321; 51/319

[58] Field of Search ..................... 51/281 R, 317, 318, 51/319, 320, 321, 410, 424, 427, 428, 431, 432

[56] References Cited

U.S. PATENT DOCUMENTS

| | | | |
|---|---|---|---|
| 3,950,642 | 4/1976 | Feld | 51/320 |
| 4,020,857 | 5/1977 | Rendemonti | 51/320 |
| 4,258,505 | 3/1981 | Scheiber | 51/317 |
| 4,583,329 | 4/1986 | Lang | 51/319 |
| 4,729,770 | 3/1988 | Higgins | 51/319 |
| 4,878,320 | 11/1989 | Woodson | 51/410 |
| 5,123,206 | 6/1992 | Woodson | 51/319 |

*Primary Examiner*—M. Rachuba
*Attorney, Agent, or Firm*—Bush, Moseley & Riddle

[57] ABSTRACT

A method is disclosed for removing water soluble salts from a metal substrate in a wet blast system in which a bicarbonate abrasive is blasted in a pressurized water stream against the surface of the metal substrate to prepare the surface for the application of a coating. The method includes the steps as indicated in FIG. 3 in which a high pressure wet blast pressurized water and sodium bicarbonate abrasive is first applied by a nozzle (14) against the surface of the metal substrate with the water soluble salts being removed or neutralized. Iron salts are present where the metal substrate is of a ferrous material such as iron or steel. Next, pressurized water without abrasive is applied by the nozzle (14) against the surface of the metal substrate for washing the surface clean and removing the neutralized water soluble salts. The water for the wet blast system is of a very high purity characterized by a conductivity of between 0.5 and ten (10) micromohs/cm. To confirm the removal of the salts to an amount less than one (1) ppm, a ferricyanide testing is performed on the surface of the metal substrate. An apparatus for carrying out the method is shown in FIG. 2.

2 Claims, 1 Drawing Sheet

METHOD FOR REMOVAL OF SURFACE CONTAMINANTS FROM METAL SUBSTRATES

FIELD OF THE INVENTION

This invention relates to a method for the removal of surface contaminants from metal substrates, and more particularly to such a method in which an abrasive material is blasted in a pressurized water stream against the surface of such metal substrates for cleaning the surface.

BACKGROUND OF THE INVENTION

Various coatings are applied to metal substrates. It is highly desirable that the metal substrate be effectively cleaned of contaminants prior to the application of the coating so that the useful coating life may be prolonged. Contaminants include liquid halogens, sulfur compounds, and occasionally nitrogen compounds. Such surface contaminants include water soluble salts, such as chlorides, sulfates and nitrates. On steel substrates such salts are iron salts (ferrous and ferric salts.)

The presence of water soluble salts on substrates has long been recognized as a major factor in reducing coating life. The detrimental effect of these contaminants on coating performance has been discussed in coatings related literature for almost 30 years. Water soluble salts on a substrate initiate coating disbondment (and substrate corrosion) through an osmotic blistering process which is described below.

In the event of a media blasted steel substrate, ferrous chloride is formed whenever steel or iron soluble chloride in moisture are in contact. This reaction, in itself, is a strong corrodant of steel surfaces. Upon exposure to air, ferrous chloride oxidizes to ferric chloride, a hygroscopic salt with a natural affinity for moisture in the air. Trace amounts of either ferric or ferrous chloride remaining on the substrate accumulate moisture from the air resulting in the formation of a concentrated iron chloride solution on the surface of the steel substrate. Iron ions, chloride ions and water comprise an electrolytic solution that drives an electrochemical corrosion reaction. Coatings applied over such a substrate fail in a short period of time due to the concentrated iron chloride solution on the substrate drawing water through the coating by osmosis and creating a blistering or disbondment of the coating. Rates of coating failure due to osmotic blistering are dependent on the thickness and porosity of the coating.

Contamination of substrates from soluble salts has been identified as the source of coating failure and has been thoroughly documented. Practical cost effective solutions to the problem have eluded routineers in the coating science field. Complicating the search for cost effective solutions is the lack of standards defining acceptable levels of soluble salt contaminations or concentrations on substrates. The level of cleanliness required varies significantly with the service environment and the characteristics of the coating selected. However, independent of these variables, "the cleaner the substrate, the greater the resistance to coating disbondment".

Until recently, blast cleaning specifications have not addressed removal of non-visible surface contaminants. Conventional grit blasting techniques were not designed to remove ionic contamination. Dry abrasive blasting can not efficiently remove localized sources of corrosion initiation sites (commonly referred to as corrosion cells) because an operator may not be able to see such contaminants and direct a dry grit blast against such corrosion initiation sites. Efforts to develop methods for removal of these non-visible contaminants from substrates have been generally unsuccessful although several techniques have been tried with partial success, such as, for example, (1) dry blasting followed by water rinsing (several cycles), (2) hard grit wet abrasive blasting, (3) high pressure washing, and (4) acid washing followed by water rinsing.

SUMMARY OF THE INVENTION

The present invention is particularly directed to a method for the removal of surface contaminants from metal substrates including as a first step the blasting with an abrasive, such as sodium bicarbonate, in a pressurized stream of water against the surface of the substrate with the water having a high purity. After the abrasive blast against the metal substrate, a pressurized high purity water wash is applied against the surface of the metal substrate in a second step. The water wash removes neutralized soluble salts, other surface contaminants, and any residual abrasive material. The treatment of the surface of the metal substrate in accord with the process described above results in a superior cleaned surface that is free of any detectable ionic contaminants.

Testing of the cleaned surface is performed to confirm the results. Using an abrasive material, such as sodium bicarbonate, and water of a high degree of purity (e.g., less than around ten (10), preferably less than (5) micromohs/cm), a high level of cleaning action is achieved as a result of the following interacting factors;

1) the abrasive, scrubbing action of the sodium bicarbonate particles on the substrate achieved by the combined effect of the hardness of the sodium bicarbonate particles and the impact velocity attained by the accelerating action of the high pressure water jet at a pressure between around 1,500 psi and 5,000 psi with an optimum pressure of around 3,000 psi,
2) the chemical action, in the form of a neutralization reaction, of the sodium bicarbonate on the ionic contaminants on the substrate, and
3) the medium pressure washing at a pressure between around 500 psi and 10,000 psi to remove neutralized soluble salts, impacted particles, and other surface contaminants from the substrate.

A variety of tests may be utilized to test the presence of soluble chemical salts such as ferrous sulfates, ferrous sulfides, ferrous chlorides, or sodium chloride. Some tests are effective to measure sodium chloride (Na Cl) but only to around forty (40) ppm, based on a dilution of 10 ml of water per 100 square cm of substrate. A preferred test for soluble ferrous salts (e.g. for steel structures) is utilized and is effective for detecting less than one (1) equivalent part per million, (or 3.25 mg/m$^2$). Concentrations below the sensitivity of the test are negligible or "zero-detectable".

A negligible or "zero-detectable" level, of considerably less than one (1) equivalent ppm (3.25 mg/m$^2$) of soluble chemical salts or residual ionic contaminants is confirmed by measuring with potassium ferricyanide paper for ferrous salts. The test paper is prepared by saturating filter paper in a 5% by weight solution of potassium ferricyanide prepared from potassium ferricyanide crystal and an appropriate amount of distilled water. The test paper is then allowed to dry under ambient conditions. The surface of the substrate to be tested is sprayed with a fine mist of distilled water and a small piece of the freshly prepared test paper is then pressed against the sprayed surface. If a detectable level of soluble ferrous salts is present, blue dots will appear on the test paper.

The water used in the blast operation is deionized water as pure as possible with a ph range between six (6) and eight (8) and having a conductivity of between 0.5 and ten (10) micromohs/cm. Pure water by nature has a Ph close to neutral. Ionic contaminants (i.e., salts) on the surface of metals, such as steel or iron, tend to attract moisture which results in oxidation of the surface. (Rusting in the case of iron or steel). In order to remove the residual ionic contaminants or metal salts and oxidation products from the parent metal, an ultra pure water is used in water propelled abrasive cleaning of the substrate surface to avoid recontaminating the steel with impurities in the water.

Reference is made to U.S. Pat. No. 4,878,320 dated Nov. 7, 1989 for an illustration of a suitable apparatus for water propelled abrasive cleaning, the entire disclosure of which is incorporated by this reference. A suitable discharge nozzle is shown in U.S. Pat. No. 4,878,320 for applying a high pressure stream of water and sodium bicarbonate particles. A compressor provides pressurized supplies of water and air to the nozzle and a hopper provides a pressurized supply of sodium bicarbonate particles to the nozzle where the particles are propelled by a jet of water against the substrate surface. One use of the present method has been for the cleaning of the interior surface of large cylindrical tanks, such as used in the oil and gas industry, prior to application of a coating on the tank.

An object of this invention is to provide a method for the removal of surface contaminants from metal substrates where the method is particularly adapted for the removal of water soluble iron salts including ferrous or ferric salts from the surface of a iron or steel substrate.

Another object of this invention is to provide such a method for the removal of surface contaminants from metal substrates utilizing a high pressure water blast system having a sodium bicarbonate abrasive material therein.

A further object of the invention is to provide such a water blast method utilizing an abrasive with water of superior purity of less than about five (5) micromohs/cm so that mechanical removal or chemical neutralization of ionic contaminants, such as iron chloride and sulfate salts, occurs.

The following drawings illustrate apparatus for carrying out the method of this invention and the steps involved in the method.

DESCRIPTION OF THE INVENTION

Figure 1:
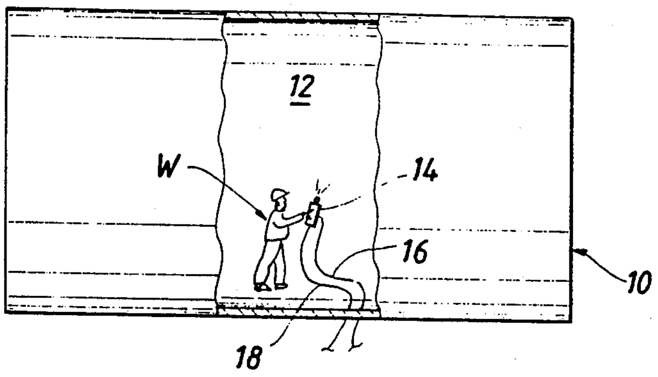
FIG. 1 is an elevational view, partly schematic, illustrating the method of the invention for removing surface contaminants from the inner surface of a steel tank prior to application of a coating.

Referring to FIG. 1, a workman W is shown within the interior of a steel cylindrical tank generally indicated at 10 which has an inner surface 12 to be treated and cleaned for removing surface contaminants prior to application of a coating. Although the interior of a steel tank is selected for illustration of the invention, structures of other materials (such as aluminum) may be cleaned using the method of this invention. Of course, the exterior of tanks or other structures may be cleaned with the method of this invention.

Inner surface 12 may have already been preliminarily cleaned as by conventional dry abrasive blasting, such as sand blasting, etc. Alternatively, such preliminary cleaning may be performed by wet abrasive blasting, high pressure water blasting, hand tools, etc. The workman W grips a nozzle 14 connected to suitable supply lines for the application of high pressure water and an abrasive material from a predetermined orifice against the surface of the metal substrate. Nozzle 14 has a propulsion chamber with high pressure water supplied through line 16 to such propulsion chamber. Abrasive, preferably sodium bicarbonate, is supplied with a stream of pressurized air through line 18 to the propulsion chamber of nozzle 14.

Figure 2:
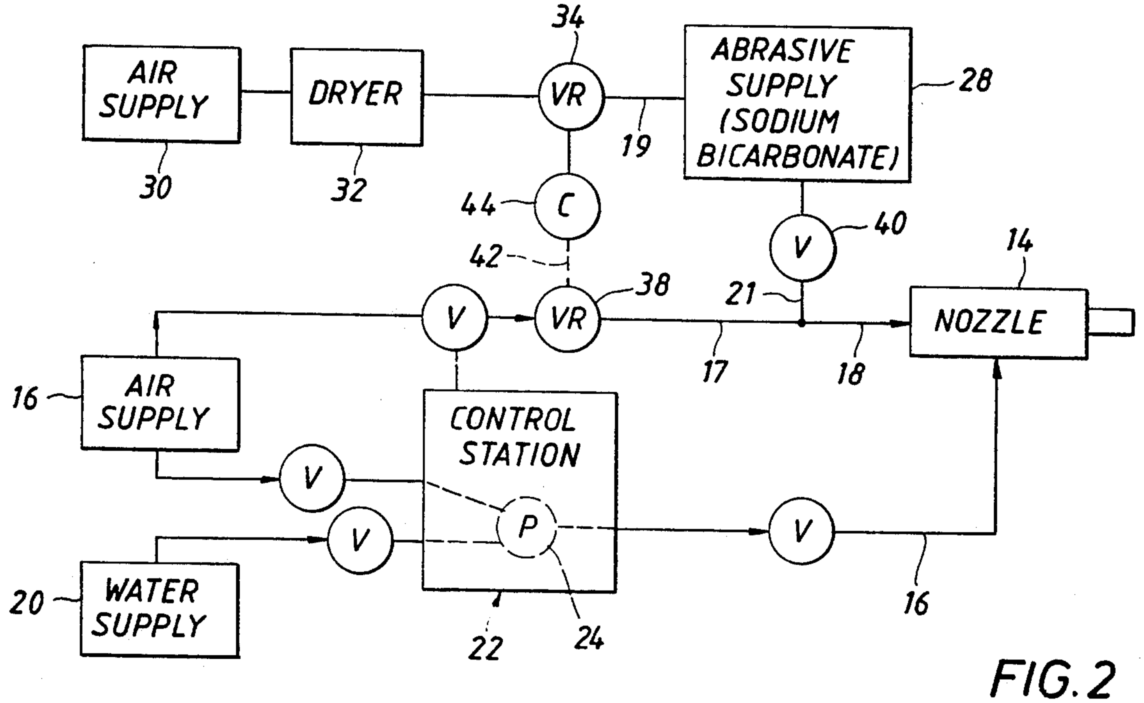
FIG. 2 is a schematic view of a wet abrasive blast system used in FIG. 1 with the method of the present invention.

Referring to FIG. 2, an apparatus which has been found to be satisfactory in carrying out the method of this invention is illustrated schematically. A water supply 20 supplies water of a superior purity to a control station 22. A high pressure water pump 24, driven by an air supply 16, supplies pressurized water through line 16 to nozzle 14 at a pressure generally between 500 psi and 10,000 psi (preferably between 1,500 psi and 5,000 psi). A supply of water soluble abrasive, preferably sodium bicarbonate, is shown at 28 in a supply hopper or "pot". Air under pressure passes from air supply 30 through a dryer 32 and a regulator valve 34 to hopper 28. Air to convey the abrasive to nozzle 14 is supplied from air supply 16 and regulator valve 38 to supply line 18. A metering valve 40 is provided for metering the abrasive material from hopper 28 to line 18. A pressure differential of around 2–5 psi is provided between the pressure in hopper 28 and the pressure in conveying line 18 to provide a suitable abrasive flow by gravity and differential pressure from hopper 28 to conveying line 18. Dryer 32 insures that no liquid phase water is present in the air supply to hopper 28. While a dried air supply is illustrated for pressurization of hopper 28, it is to be understood that other gases may be used satisfactorily such as nitrogen, argon, or hydrogen, for example. A dryer at the output of air supply 16 may be provided to dry air applied to conveying line 18, but dry gas applied to air line 17 is not essential whereas dry gas applied to hopper 28 via line 19 is essential to prevent clogging of the water soluble abrasive at the exit line 21 of the hopper.

Pressure regulators 34 and 38 are coupled to each other through line 42 having a pressure control 44 therein so that the internal pressure in hopper 28, which contains sodium carbonate particles, is always greater than the pressure in line 18. For further details of the apparatus, reference should be made to the aforementioned U.S. Pat. No. 4,878,320.

Figure 3:
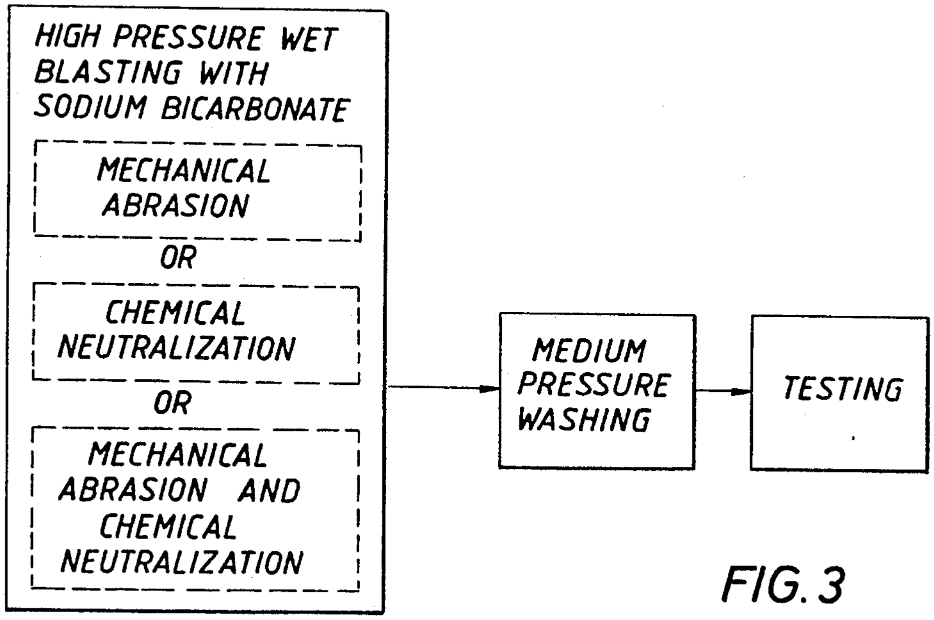
FIG. 3 is a schematic view illustrating the sequential steps involved in carrying out the method of the invention.

FIG. 3 illustrates diagrammatically the steps involved in the method of the present invention in which high pressure water of a superior purity and sodium bicarbonate are first applied against the surface of a steel substrate having contaminants including ferrous or ferric salts. The mechanical action of the abrasive against containments may remove such contaminants to a certain purity level. Such step may also involve a chemical action comprising a neutralization action by the sodium bicarbonate of any remaining ionic contaminants (i.e. water soluble iron salts). In other words, the first step of wet abrasive blasting may include mechanical abrasion of the contaminants or chemical neutralization of contaminants or both mechanical abrasion and chemical neutralization.

Next, a pressurized washing with the superior purity water at a pressure generally between 200 psi and 20,000 psi is provided against the substrate to remove the neutralized soluble salts and other surface contaminants. Next, a test is provided on the surface of the substrate to confirm the absence of any iron salts of an amount greater than one equivalent (1) ppm. To test for ferrous salts, a potassium ferricyanide test is conducted.

As specific but non-limiting examples of this method in which satisfactory results were obtained, the following two specific examples are provided.

EXAMPLE I

The substrate comprised an eight (8) foot diameter steel pipe. Water of a purity of 5 micromohs/cm at a pressure of 3,000 psi propelled a sodium bicarbonate abrasive material in a blast from a discharge nozzle against the surface of the pipe. The bicarbonate of soda to water ratio was about two (2) pounds of sodium bicarbonate for one (1) gallon of water. A production rate of around 240 square feet was achieved per nozzle hour. In conjunction with the initial wet/soft grit abrasive blast step, a neutralizing reaction occurred between the water soluble iron salts and the bicarbonate of soda. Next, a wash step was initiated with a pressure of about 8,000 psi with a water purity of 5 micromohs/cm at a production rate of around 750 square feet per nozzle hour. The cleaned substrate surface was then tested by the aforementioned potassium ferricyanide test and a "zero-detectable" level under one (1) ppm was confirmed.

EXAMPLE II

Another test was conducted for cleaning the interior of a cylindrical steel tank having a diameter of about 135 feet. Water of a purity of 5 micromohs/cm with bicarbonate of soda at a ratio of about two (2) pounds of sodium bicarbonate to one (1) gallon of water was applied at a pressure of about 3,000 psi. A production rate of over 300 square feet per nozzle hour was achieved. The water wash step with water of a purity of 5 micromohs/cm was applied at a pressure of 500 psi at a production rate of 3,750 square feet per nozzle hour. Testing was conducted after the water washing and a zero detectable level of iron salts on the surface of the steel substrate was confirmed.

The sodium bicarbonate material used in the above examples is designated as a regular coarse granular sodium bicarbonate in accord with the following specifications.

| Particle Size | Specifications Cumulative Sievings | Typical Values |
|---|---|---|
| USS #60 | 20% Maximum | 4.4% |
| USS #70 | 40% Maximum | 22.3% |
| USS #100 | 50% Minimum | 65.7% |

-continued

| Particle Size | Specifications Cumulative Sievings | Typical Values |
|---|---|---|
| USS #170 | 90% Minimum | 92.3% |

Removal of other chemically reactive salts from other metal substrates such as aluminum, stainless steel, titanium, brass, copper, or other metals will be possible using the process of this invention, perhaps through the use of other abrasive chemical particulates in the wet abrasive blasting step of the process.

While sodium bicarbonate has been illustrated as the preferred abrasive material, other abrasive materials for neutralizing soluble iron salts, particularly bicarbonate materials, such as potassium bicarbonate or ammonium bicarbonate may be used under certain conditions and provide satisfactory results.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A method for removing iron salts from a surface of a metal substrate utilizing a source of pressurized water, and a source of a bicarbonate abrasive; said method comprising the steps of:

applying pressurized water and the bicarbonate abrasive against the surface of said metal substrate at a predetermined high pressure so that water soluble iron salts on the surface of said metal substrate are physically removed or chemically neutralized or both physically removed and chemically neutralized; and then applying pressurized water at a predetermined pressure against the surface of said metal substrate so that any neutralized salts are removed from the surface of said metal substrate; and then testing the surface of said metal substrate after the removal of the neutralized iron salts from the surface of said metal substrate to determine that less than one (1) ppm of neutralized iron salts remain on the surface of said metal substrate.

2. A method for removing salts from a surface of the metal substrate to prepare said surface for the application of a predetermined coating and utilizing a fluid discharge nozzle operatively connected to a source of pressurized water, and a source of bicarbonate abrasive entrained in a stream of air for neutralizing the salts; said method comprising the steps of:

providing a water supply line to said nozzle;

providing a separate gas pressurized bicarbonate abrasive supply line from said abrasive source to said nozzle for the discharge of pressurized water and bicarbonate abrasive from said nozzle against the surface of said metal substrate so that water soluble salts on the surface of said substrate are neutralized;

then applying pressurized water at a predetermined pressure against the surface of said metal substrate for washing neutralized iron salts from the surface of said metal substrate thereby to prepare the surface of said substrate for the application of a coating; and then testing the surface of said metal substrate after the washing of the neutralized iron salts from the surface of said metal substrate to determine that less than one (1) ppm of neutralized iron salts remain on the surface to be coated of said metal substrate.

* * * * *